United States Patent
Webb et al.

[15] 3,674,805

[45] July 4, 1972

[54] METHOD OF PREPARING POLY(COPPERPHTHALOCYANINE)

[72] Inventors: Richard V. Webb; Donald C. Batesky, both of Rochester, N.Y.

[73] Assignee: Eastman Kodak Company, Rochester, N.Y.

[22] Filed: Sept. 2, 1969

[21] Appl. No.: 854,738

[52] U.S. Cl. .....................................................260/314.5 R
[51] Int. Cl. ......................................................C09b 17/04
[58] Field of Search .........................260/314.5, 465; 12/4, 5

[56] References Cited

UNITED STATES PATENTS 3,245,965  4/1966  Tuemmler ..........................260/314.5

*Primary Examiner*—Henry R. Jiles
*Assistant Examiner*—Harry I. Moatz
*Attorney*—Walter O. Hodsdon and Alfred P. Lorenzo

[57] ABSTRACT

Poly(copperphthalocyanine) is prepared by reaction of 1,2,4,5-tetrabromobenzene and cuprous cyanide in an N,N-dialkylamide, such as N,N-dimethylformamide or N,N-dimethylacetamide, which serves as both solvent and catalyst for the reaction. The reaction can be carried out at atmospheric pressure with temperature control provided by refluxing the reaction mixture so that it is well suited to use in commercial scale production.

8 Claims, No Drawings

METHOD OF PREPARING POLY(COPPERPHTHALOCYANINE)

This invention relates to the polymeric phthalocyanine known as poly(copperphthalocyanine) and in particular to a novel method for its preparation.

Poly(copperphthalocyanine) is a member of the class of metal-containing polyphthalocyanines which are useful as organic semiconductors, as catalysts in oxidation reactions, and as pigments. Like the better known and more widely utilized monomeric metal-containing phthalocyanines, the metal-containing polyphthalocyanines comprise a 16-membered tetraazaporphine ring of alternate carbon and nitrogen atoms substituted with a central metal atom, but are made up of two or more of these rings joined together through mutually shared unsaturated hydrocarbon rings whereas the monomeric phthalocyanines contain only a single tetraazaporphine ring. Monomeric copper phthalocyanine can be represented by the structural formula:

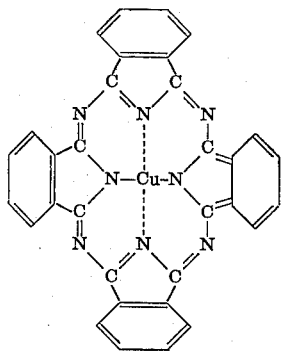

while poly(copperphthalocyanine) can be represented by the structural formula:

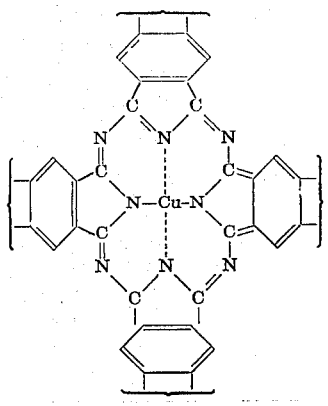

with the number of repeating units being at least two and usually about six to eight. The substituents on the terminal unsaturated rings of the polymer are dependent upon the method of synthesis and upon the procedure used in recovering the polymer from the reaction system and may, for example, be hydrogen atoms, halogen atoms, nitrile groups, carboxyl groups, etc.

Metal-containing and metal-free polyphthalocyanines and their properties are described in U.S. Pat. No. 3,245,965. Other patents pertaining to the polyphthalocyanines and their uses include U.S. Pat. Nos. 2,980,833, 3,023,164 and 3,293,075.

Several methods of preparing poly(copperphthalocyanine) have been described heretofore. Among these methods are the following:

1. Reaction of pyromellitonitrile with cuprous chloride as described in U.S. Pats. Nos. 3,245,965, 2,980,833 and 3,293,075 and in the article "Electrical Properties of Poly-Copper Phthalocyanine" by A. Epstein and Bernard S. Wildi, J. Chem. Phys. 32 No. 2, 324–329 (1960).
2. Reaction of cuprous chloride with a mixture of pyromellitic acid and phthalic anhydride or a mixture of 3,3', 4,4'-tetracarboxydiphenyl ether and phthalic anhydride as described in the article "Polymeric Phthalocyanines" by C. S. Marvel and John H. Rassweiler, J. Am. Chem. Soc. 80, 1197–1199 (1958).
3. Reaction of copper-bronze with 3,3',4,4'-tetracyanodiphenyl ether and phthalonitrile as described in the article "Polymeric Phthalocyanines" by C. S. Marvel and Michael M. Martin, J. Am. Chem. Soc. 80 6600–6604 (1958).
4. Reaction of cuprous chloride with pyromellitic dianhydride and urea as described in the article "Copper Phthalocyanine Polymers" by William C. Drinkard and John C. Bailar, Jr., J. Am. Chem. Soc. 81 4795–4797 (1959).

It has now been discovered that poly(copperphthalocyanine) can be prepared by the reaction of 1,2,4,5-tetrabromobenzene and cuprous cyanide in an N,N-dialkylamide. This method may be easily adapted to use on a commercial scale whereas the methods for preparing poly(copperphthalocyanine) known heretofore suffer from serious shortcomings which render impractical their commercial utilization. For example, the reaction of pyromellitonitrile with cuprous chloride requires high temperatures and pressures and the use of an inert atmosphere, e.g., a temperature of 350° C under 2,000 pounds pressure of nitrogen, whereas the method of this invention requires no pressure or inert atmosphere and utilizes much lower temperatures. Moreover, pyromellitonitrile is a very costly chemical whereas the starting materials used in the method of this invention are inexpensive and readily available. The reaction of cuprous chloride with pyromellitic dianhydride and urea is essentially a solid phase polymerization procedure and is obviously not practical for use on a commercial scale. The other methods of preparing poly(copperphthalocyanine) which are known to the art also suffer from one or more disadvantages which essentially preclude their commercial utilization, such as requiring the use of expensive starting materials, high temperatures and/or high pressures and providing low yields of product.

More specifically, the method of this invention comprises mixing together 1,2,4,5-tetrabromobenzene, cuprous cyanide and an N,N-dialkylamide, heating the mixture for a sufficient period of time to form poly(copperphthalocyanine), and recovering the poly(copperphthalocyanine) from the reaction mixture. The N,N-dialkylamide has been found to function as both a solvent for the reactants and a catalyst for the reaction and to effectively promote the reaction so that it can be carried out at atmospheric pressure and at moderate temperatures, e.g., the reflux temperature of the reaction mixture. Since the reflux temperature, e.g., temperatures of about 150° C, can be readily obtained by heating with pressurized steam, this feature of the invention is an important advantage as compared with prior methods requiring higher temperatures to effect reaction.

The preferred N,N-dialkylamides for the purposes of this invention are the lower N,N-dialkylamides of aliphatic acids of one to four carbon atoms, the term "lower N,N-dialkylamides" being used to mean N,N-dialkylamides in which the alkyl substituents each contain one to four carbon atoms. Illustrative examples of these N,N-dialkylamides are N,N-dimethylformamide, N,N-dimethylacetamide, N,N-diethylformamide, N,N-dipropylformamide, N,N-dibutylformamide, N,N-diethylacetamide, N,N-dimethylpropionamide, N,N-dimethylbutyramide, and the like.

The reaction of 1,2,4,5-tetrabromobenzene and cuprous cyanide in an N,N-dialkylamide proceeds satisfactorily at temperatures in the range from about 125° to about 200° C. It is most advantageously conducted by refluxing the reaction mixture at atmospheric pressure. Subatmospheric or super-atmospheric pressures can be employed in carrying out the reaction, but no significant advantage is gained thereby. Temperatures higher than 200° C can be used, if desired, but provide no advantage which would justify their use. A period of several hours is ordinarily required for the reaction, and improved yields of poly(copperphthalocyanine) can usually be obtained by the use of even longer reaction times, e.g., times of 15 hours or more. Thus, it is preferred to heat the reaction mixture for a period of at least about 5 hours, and more preferably at least about 15 hours. The reactants are suitably employed in a proportion of at least about 4 moles of cuprous cyanide per mole of 1,2,4,5-tetrabromobenzene. Lesser amounts of cuprous cyanide can be used but lower yields of product will result. It is preferred to employ a moderate excess over the stoichiometric amount of 4 moles, i.e., about 4.5 to about 6 moles of cuprous cyanide per mole of 1,2,4,5-tetrabromobenzene. The N,N-dialkylamide functions as both a solvent and a catalyst. Where it is used as the sole solvent it must, of course, be employed in an amount at least sufficient to effect solution or suspension of the reactants; however, other diluents, e.g., an alkylene glycol such as triethylene glycol, can be employed together with the N,N-dialkylamide, in which case lesser amounts of the N,N-dialkylamide are permissible. With the N,N-dialkylamide as the sole solvent, good results will be obtained by using at least about 4 and up to about 20, or more, parts by weight of N,N-dialkylamide per part of 1,2,4,5-tetrabromebenzene.

The poly(copperphthalocyanine) can be recovered from the reaction mixture by any suitable procedure. For example, since it is present in the reaction mixture as a fine suspension, it can be isolated by filtering the hot mixture. Alternatively, the hot reaction mixture can be poured into cold water and the resulting precipitate collected. To free the product from contaminants, it is preferred to wash it with ethanol, then with pyridine, and then with a solution of ethylenediamine in water. Purification can be effected by heating in a solution of sodium cyanide and water prior to the final washing step.

Depending on the reaction time and the procedures used in recovering the poly(copperphthalocyanine), the substituents on the terminal unsaturated rings may be bromine, nitrile, carbamoyl or carboxyl groups. However, the essential structure of the polymer is the same regardless of the particular substituents on the terminal rings.

The invention is further illustrated by the following examples of its practice.

EXAMPLE 1

To a one-liter 3-necked flask equipped with a stirrer, thermometer, reflux condenser and an electric heating mantle there was added 100 grams (0.25 mole) of 1,2,4,5-tetrabromobenzene, 110 grams (1.2 moles) of cuprous cyanide, and 500 milliliters of N,N-dimethylformamide. The mixture was refluxed with stirring for six hours and then poured into two liters of cold water. The blue grey precipitate which formed was collected and washed with water and the damp solid was then added to a solution of 300 grams of sodium cyanide in 800 milliliters of water and heated with stirring at 60° to 70° C for one half hour. A dark blue solid precipitated and this material was collected, washed well with hot water, extracted with ethanol and then with pyridine, and dried in an air oven to provide a yield of 50 grams of poly(copperphthalocyanine). The poly(copper-phthalocyanine) was analyzed by infrared, x-ray diffraction and emission spectograph and was analyzed for carbon, hydrogen and nitrogen. The results of the elemental analysis were as follows:

carbon — 53.3 percent
hydrogen — 1.4 percent
nitrogen — 16.1 percent

Referring to Table I in the article by William C. Drinkard and John C. Bailar, Jr., J. Am. Chem. Soc. 81 4795–4797 (1959), this analysis indicates that the polymer contained several repeating units.

Increasing the reaction time from 6 to 15 hours raised the yield of poly(copperphthalocyanine) from 50 to 75 grams.

EXAMPLE 2

To a one-litter 3-necked flask equipped with a stirrer, thermometer, reflux condenser and an electric heating mantle there was added 100 grams (0.25 mole) of 1,2,4,5-tetrabromobenzene, 110 g. (1.2 moles) of cuprous cyanide and 500 milliliters of N,N-dimethylacetamide. The mixture was refluxed with stirring for 4 hours, then cooled to about 135° C, and the fine dark blue-black suspension collected by filtering. The filter cake was washed with hot ethanol followed by a hot (60° C) 30% solution of ethylenediamine in water, then with hot (60° C) pyridine and finally with water and then dried in an oven to provide a yield of 50 grams of poly(copperphthalocyanine). The poly(copperphthalocyanine) gave essentially the same infrared spectra and had the same solubility characteristics as the product obtained in Example 1.

While applicants do not wish to be bound by any theoretical explanation for the manner in which their invention functions, it is postulated that cyanobenzenes are formed by reaction of the 1,2,4,5-tetrabromobenzene and cuprous cyanide and that the phthalocyanine structure results from a polymerization of the ortho nitrile groups with the cuprous bromide which is formed as a by-product in the synthesis of the cyanobenzenes. The polymer formation appears to be rapid and the rate controlling step to be the formation of the cyanobenzenes. No reaction was obtained when zinc cyanide or silver cyanide were substituted for the cuprous cyanide nor was there any reaction when 1,2,4,5-tetrachlorobenzene was substituted for the 1,2,4,5-tetrabromobenzene. The presence of the N,N-dialkylamide is essential to catalyze the reaction. Thus, for example, when triethyleneglycol was used in place of an N,N-dialkylamide no reaction occurred. Some reaction occurred at 190° to 200° C when quinoline was substituted for the N,N-dialkylamide but no product could be isolated from the tarry reaction mixture. With a mixture of 80 percent triethyleneglycol and 20 percent N,N-dimethylformamide, or a mixture of 80 percent triethyleneglycol and 20 percent N,N-dimethyl-acetamide, the reaction proceeded satisfactorily at 180° to 200° C, evidencing thereby that N,N-dialkylamides are catalysts for the reaction.

The invention has been described in detail with particular reference to preferred embodiments thereof, but it will be understood that variations and modifications can be effected within the spirit and scope of the invention.

We claim:
1. A method for preparing poly(copperphthalocyanine) which comprises mixing together 1,2,4,5-tetrabromobenzene, cuprous cyanide and an N,N-dialkylamide of an alkanoic acid of one to four carbon atoms, heating said mixture to at least about 125° C and for a sufficient period of time to form poly(copperphthalocyanine), and recovering said poly(copperphthalocyanine) from said mixture.

2. The method as described in claim 1 wherein said cuprous cyanide is employed in a proportion of at least about 4 moles per mole of said 1,2,4,5-tetrabromobenzene and said mixture is heated under reflux conditions at atmospheric pressure.

3. The method as described in claim 1 wherein said cuprous cyanide is employed in a proportion of from about 4.5 to about 6 moles per mole of said 1,2,4,5-tetrabromobenzene and said mixture is heated under reflux conditions at atmospheric pressure.

4. The method described in claim 1 wherein said mixture is heated at a temperature of from about 150° to about 200° C.

5. The method as described in claim 4 wherein said N,N-dialkylamide is N,N-dimethylformamide.

6. The method as described in claim 4 wherein said N,N-dialkylamide is N,N-dimethylacetamide.

7. A method for preparing poly(copperphthalocyanine) which comprises mixing together 1,2,4,5-tetrabromobenzene, cuprous cyanide, and N,N-dimethylformamide, heating said mixture at reflux for a period of at least about 5 hours to form poly(copperphthalocyanine), and recovering said poly-(copperphthalocyanine) from said mixture.

8. A method for preparing poly(copperphthalocyanine) which comprises mixing together 1,2,4,5-tetrabromobenzene, cuprous cyanide, and N,N-dimethylacetamide, heating said mixture at reflux for a period of at least about 5 hours to form poly(copperphthalocyanine), and recovering said poly(copperphthalocyanine) from said mixture.

* * * * *